(12) United States Patent
Stoner et al.

(10) Patent No.: US 11,161,625 B2
(45) Date of Patent: Nov. 2, 2021

(54) SYSTEMS AND METHODS FOR AIRCRAFT BRAKING SIGNAL

(71) Applicant: GOODRICH CORPORATION, Charlotte, NC (US)

(72) Inventors: Rebecca Stoner, Phoenix, AZ (US); Andre Hessling von Heimendahl, Koblenz (DE); Todd Knight, Chandler, AZ (US)

(73) Assignee: Goodrich Corporation, Charlotte, NC (US)

(*) Notice: Subject to any disclaimer, the term of this patent is extended or adjusted under 35 U.S.C. 154(b) by 22 days.

(21) Appl. No.: 16/750,656

(22) Filed: Jan. 23, 2020

(65) Prior Publication Data

US 2021/0229831 A1 Jul. 29, 2021

(51) Int. Cl.
*B64D 47/06* (2006.01)
*H05B 47/14* (2020.01)

(52) U.S. Cl.
CPC ............. *B64D 47/06* (2013.01); *H05B 47/14* (2020.01)

(58) Field of Classification Search
None
See application file for complete search history.

(56) References Cited

U.S. PATENT DOCUMENTS

| | | | |
|---|---|---|---|
| 5,736,926 A | 4/1998 | Winholtz | |
| 9,855,889 B1 | 1/2018 | Mullis et al. | |
| 9,856,035 B1 | 1/2018 | Keller et al. | |
| 10,081,297 B1* | 9/2018 | Yelda | H05B 45/10 |
| 10,262,212 B1 | 4/2019 | Eiden | |
| 10,343,597 B2 | 7/2019 | Pavoni | |
| 10,378,721 B2 | 8/2019 | Norris et al. | |
| 2005/0105296 A1 | 5/2005 | French | |
| 2012/0133283 A1* | 5/2012 | Everett | H05B 31/50 315/77 |
| 2016/0144918 A1 | 5/2016 | Lee | |
| 2017/0259732 A1 | 9/2017 | Blevins | |
| 2017/0355470 A1* | 12/2017 | Keller | B64C 19/00 |
| 2019/0241120 A1 | 8/2019 | Locey | |

FOREIGN PATENT DOCUMENTS

AR 019796 3/2002

OTHER PUBLICATIONS

Europen Patent Office, European Search Report dated Jun. 18, 2021 in Application No. 21152020.0.

* cited by examiner

*Primary Examiner* — Dedei K Hammond
(74) *Attorney, Agent, or Firm* — Snell & Wilmer L.L.P.

(57) ABSTRACT

An exterior lamp for an aircraft may comprise a housing, a navigation light disposed within the housing, and a brake light disposed within the housing, wherein the brake light is configured to illuminate in response to a brake signal. The exterior lamp may include a controller disposed within the housing, and a tangible, non-transitory memory configured to communicate with the controller, the tangible, non-transitory memory having instructions stored thereon that, in response to execution by the controller, cause the controller to perform operations comprising receiving a brake signal and illuminating the brake light in response to a brake signal.

17 Claims, 5 Drawing Sheets

SYSTEMS AND METHODS FOR AIRCRAFT BRAKING SIGNAL

FIELD

The present disclosure relates generally to aircraft systems and, more particularly, to aircraft exterior lighting systems.

BACKGROUND

Popularity of air travel has generated an increase in aircraft on-ground traffic and, thereby, increased risk of on-ground collision. Aircraft exterior lights are heavily regulated in operation. Present regulations do provide for traditional forms of luminous indicators which would otherwise call attention to particular aircraft on-ground movements such as, for example, deceleration during taxi. Aircraft are often aligned single file when taxiing on the ramp prior to departure. During on-ground night operations, it is difficult for pilots to determine whether the lead aircraft is moving, decelerating, or has come to a stop based on traditional exterior lights.

SUMMARY

In various embodiments, an aircraft brake signal lamp comprises a housing, a navigation light disposed within the housing, and a brake light disposed within the housing, wherein the brake light is configured to illuminate in response to a brake signal. In various embodiments, a controller may be disposed within the housing, and a tangible, non-transitory memory may be configured to communicate with the controller, the tangible, non-transitory memory having instructions stored thereon that, in response to execution by the controller, cause the controller to perform operations comprising receiving a brake signal and illuminating the brake light in response to a brake signal.

In various embodiments, the housing is defined by a major axis and the navigation light and the brake light are separated from one another along the major axis by a distance D of not less than 1 in. In various embodiments, the distance D is between 1 in and 10 in. In various embodiments, a first turn indicator light and a second turn indicator light are disposed within the housing. In various embodiments, a strobe light may be disposed within the housing. In various embodiments, the operations further comprise receiving an encoded signal and decoding the encoded signal to generate the brake signal. In various embodiments, a sensor is disposed within the housing and in communication with the controller and configured to provide sensor feedback, wherein the operations further comprise receiving a data form the sensor, determining a deceleration condition, and illuminating the brake light based on the deceleration condition.

In various embodiments, the operations further comprise altering an intensity of a light emitted by the brake light in response to one of the brake signal or the deceleration condition. In various embodiments, the operations further comprise receiving a strobe power sense signal and inhibiting illumination of the brake light in response to the strobe power sense signal. In various embodiments, the intensity of a light emitted by the brake light is between 5% and 30% of the intensity of a light emitted by the navigation light. In various embodiments, the operations further comprise controlling the first turn indicator light and the second turn indicator light. In various embodiments, the sensor is one of an accelerometer, a global positioning sensor, or an optical flow analysis sensor.

In various embodiments, an article of manufacture is disclosed including a tangible, non-transitory computer-readable storage medium having instructions stored thereon that, in response to execution by a processor, cause the processor to perform operations comprising receiving an encoded external signal, decoding the encoded external signal to generate a brake signal, and illuminating a brake light in response to the brake signal.

In various embodiments, the operations further comprise receiving a data from a sensor, determining a deceleration condition, and illuminating the brake light in response to the deceleration condition. In various embodiments, the operations further comprise receiving a strobe power sense signal and inhibiting illumination of the brake light in response to the strobe power sense signal.

In various embodiments, an aircraft may comprise a fuselage, an empennage, and an aircraft brake signal lamp coupled to one of the fuselage or the empennage comprising a housing, a navigation light disposed within the housing, a brake light disposed within the housing, a controller, and a tangible, non-transitory memory configured to communicate with the controller, the tangible, non-transitory memory having instructions stored thereon that, in response to execution by the controller, cause the controller to perform operations comprising receiving a brake signal and illuminating the brake light in response to a brake signal.

In various embodiments, the housing is defined by a major axis and the navigation light and the brake light are separated from one another along the major axis by a distance D of between 1 in and 10 in. In various embodiments, the intensity of a light emitted by the brake light is between 5% and 30% of the intensity of a light emitted by the navigation light. In various embodiments, a first turn indicator light and a second turn indicator light are disposed within the housing and configured to be controlled by the controller. In various embodiments, a strobe light may be disposed within the housing.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
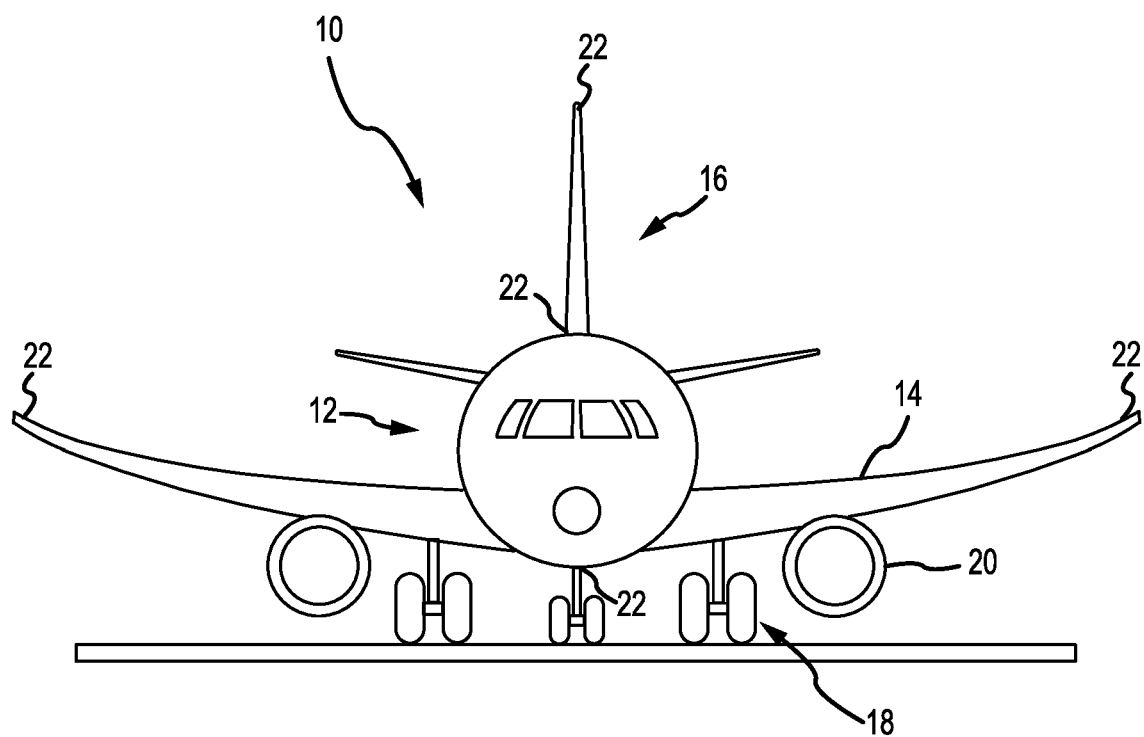
FIG. 1 illustrates an exemplary aircraft, in accordance with various embodiments.

With reference to FIG. 1, an aircraft 10 is illustrated in accordance with various embodiments. Aircraft 10 comprises a fuselage 12, wings 14, empennage 16, landing gear 18, a propulsion system, such as gas turbine engines 20, and a plurality of exterior lights 22. Exterior lights 22 may include any number of lights know to those skilled in the art such as, for example, navigation lights, logo lights, wing scan lights, runway turnoff lights, cargo loading lights, engine scan lights, anti-collision strobe lights, beacon lights, and/or the like. It will be appreciated that the number and location of the exterior lights 22 are exemplary and aircraft 10 may include any number of additional lights which may be beneficial to operation of aircraft 10 but are not illustrated. In various embodiments, at least one of the plurality of exterior lights 22 may include an aircraft brake signal lamp 200. The aircraft brake signal lamp 200 may be coupled to the empennage 16 or may be coupled at an aft most point of the fuselage 12 such as, for example, a tailcone.

Figure 2:
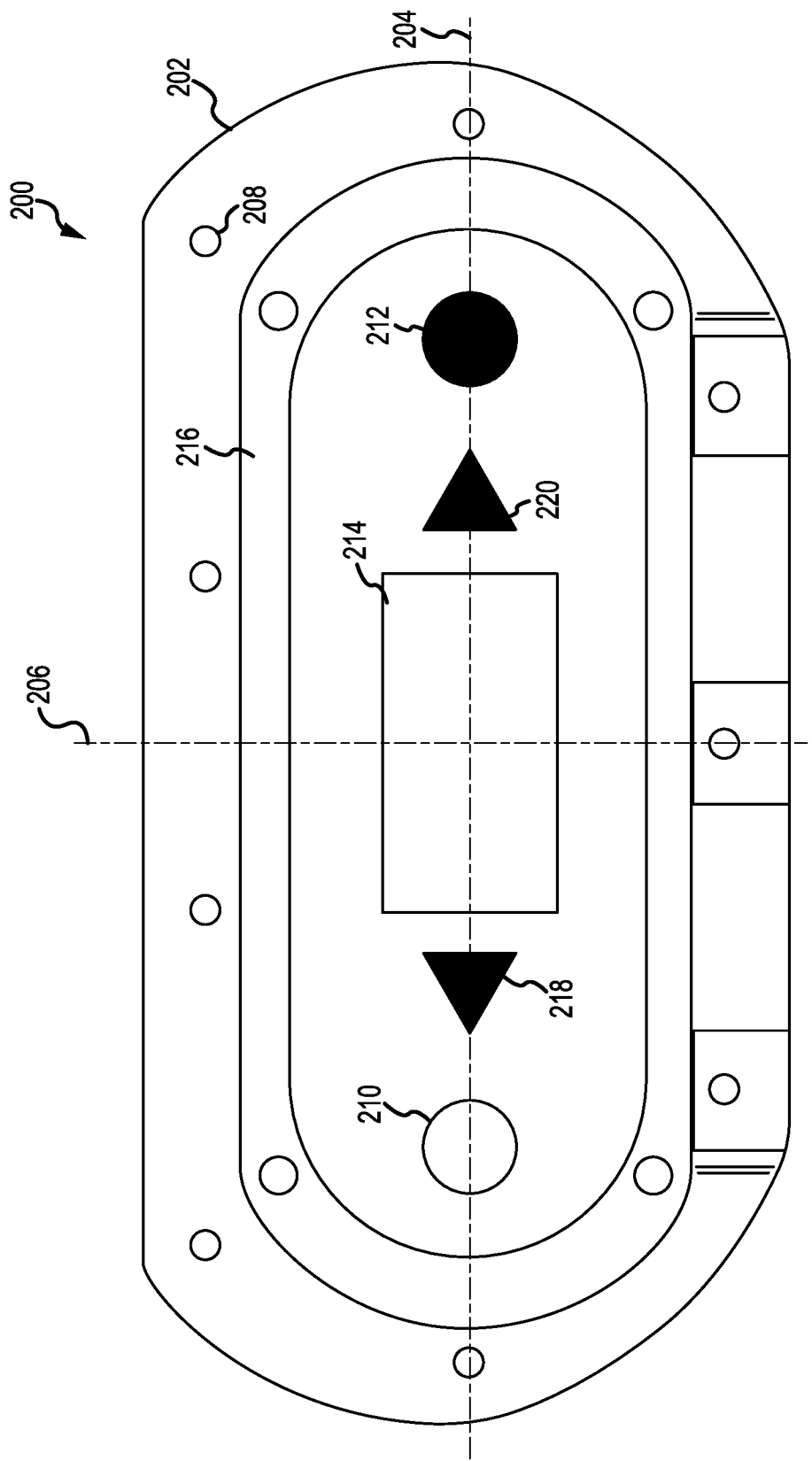
FIG. 2 illustrates an aircraft brake signal lamp, in accordance with various embodiments.

With additional reference to FIG. 2, an aircraft brake signal lamp 200 is illustrated in accordance with various embodiments. Aircraft brake signal lamp 200 includes a housing 202. The housing 202 may have a relatively rectilinear or pill-shaped profile defined by a major axis 204 and a minor axis 206. In various embodiments, the ratio of the minor axis to the major axis may be at least 2:1. Housing 202 may include a plurality of fastener holes 208 distributed about the periphery of the housing 202 to facilitate coupling to the aircraft 10. The housing 202 may contain a navigation light 210 and a brake light 212. The navigation light 210 and the brake light 212 are separated from one another along the major axis 204 by a distance D of not less than 1 inch [2.54 cm]. In various embodiments the distance D may be between 1 in [2.54 cm] and 3 in [7.62 cm], or may be between 3 in [7.62 cm] and 5 in [12.7 cm], or may be between 5 in [12.7 cm] and 10 in [25.4 cm]. In various embodiments, a strobe light 214 is contained within the housing 202 and may be disposed relatively between the navigation light 210 and the brake light 212 along the major axis 204. In like regard, housing 202 may contain a first turn indicator light 218 and a second turn indicator light 220. The turn indicators lights (218, 220) are separated from one another along the major axis 204 by the distance D. In this regard, the distance D may be selected to enable an observer to perceive the navigation light 210 and the brake light 212 independent light sources at a desired observation distance O from the brake signal lamp 200. For example, an observer may have a spatial resolution of $\frac{1}{60}^{th}$ of a degree and the distance O at which the observer may perceive the navigation light 210 and the brake light 212 independent light sources may be governed by the relationship of $O=D\div\tan(\frac{1}{60})$ In various embodiments, the turn indicator lights (218, 220) may lie relatively inboard of the navigation light 210 and the brake light 212 along the major axis 204. In various embodiments, the turn indicator lights (218, 220) may be displaced along the minor axis relatively above or below the major axis 204. Each of the navigation light 210, the brake light 212, the first turn indicator light 218, the second turn indicator light 220, and the strobe light 214 may be enclosed by a protective lens 216 coupled to the housing.

Figure 3:
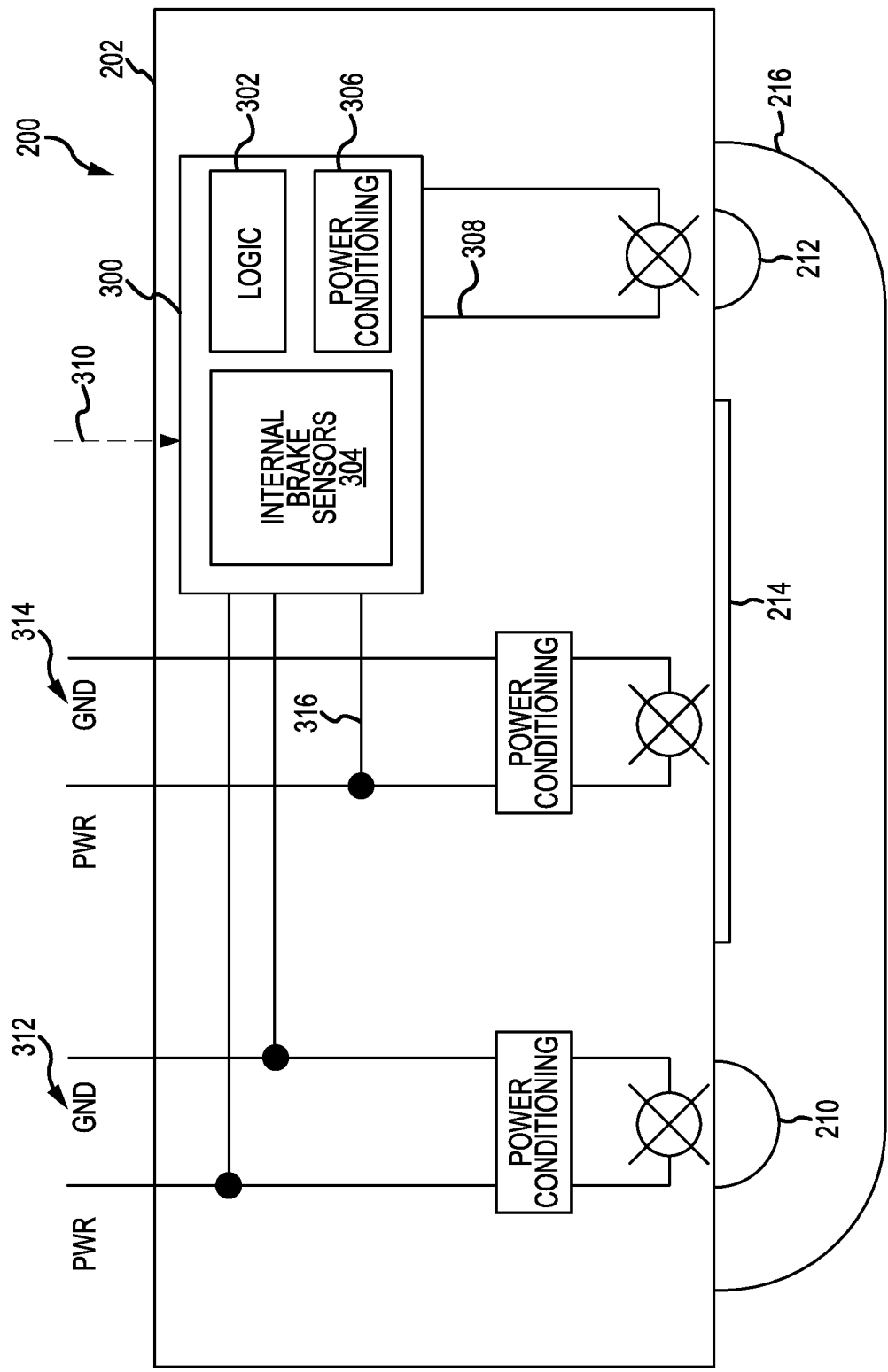
FIG. 3 illustrates a schematic block diagram of an aircraft brake signal lamp, in accordance with various embodiments.

With additional reference to FIG. 3, details of aircraft brake signal lamp 200 are illustrated in schematic detail in accordance with various embodiments. Brake signal lamp 200 includes a control system 300 module comprising a first power conditioning module 306 and sensors 304 in electronic communication with a controller 302 which may be integrated into computer systems onboard aircraft 10. In various embodiments, each of the navigation light 210, the brake light 212, and the strobe light 214 may have a corresponding power conditioning module configured to condition electrical power for use by a light source such as an incandescent element or a light emitting diode (LED). In various embodiments, controller 302 may be configured as a central network element or hub to access various systems, engines, and components of system 300. Controller 302 may comprise a network, computer-based system, and/or software components configured to provide an access point to various systems, engines, and components of system 300. In various embodiments, controller 302 may comprise a processor. In various embodiments, controller 302 may be implemented in a single processor. In various embodiments, controller 302 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 302 may comprise a processor configured to implement various logical operations in response to execution of instructions, for example, instructions stored on a non-transitory, tangible, computer-readable medium configured to communicate with controller 302. In this regard, controller 302 may be configured to control various components of system 300 via control signals such as, for example, brake lamp power 308.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

System 300 comprises one or more feedback elements to monitor and measure aircraft 10 and aircraft brake signal lamp 200 characteristics. For example, controller 302 is in electronic communication with a plurality of sensors 304 which may be coupled to or in direct electronic communication with aircraft systems such as, for example, propulsion systems, electrical systems, and/or the like. Controller 302 may be in electronic communication with the full suite of aircraft sensors and other data sources available within and without the aircraft 10. Sensors 304 may comprise a temperature sensor, a torque sensor, a speed sensor, a pressure sensor, a position sensor, an accelerometer, a voltmeter, an ammeter, a wattmeter, an internal brake sensor, an optical sensor, or any other suitable measuring device known to those skilled in the art. Sensors 304 may be configured to transmit measurements to controller 302, thereby providing sensor feedback about the measured system. The sensor feedback may be, for example, a speed signal, or may be position feedback, temperature feedback, pressure feedback or other data.

In various embodiments, controller 302 may receive external signals 310 such as, for example, a brake signal. External signals 310 may, in various embodiments, be carried on navigation light power lines 312 or strobe or strobe light power lines 314. For example, external signals 310 may be encoded by a "data over powerline" modem and transmitted to the controller 302. Controller 302 may decode the encoded external signals and command the power conditioning module 306 to send power to the brake light 212 in response to the external signals 310. In various embodiments, at least one of the plurality of sensors 304 are located within the housing 202 (i.e., an internal sensor). In various embodiments the internal sensor may be one of an accelerometer, a global positioning sensor, or an optical flow analysis sensor. Controller 302 may determine based on data received from the internal sensor a deceleration condition of aircraft 10. Controller 302 may determine the deceleration condition based on variance of the data with respect to time. In response to the deceleration condition, controller 302 may command the power conditioning module 306 to send power to the brake light 212.

In various embodiments, system 300 may receive power from the navigation light power lines 312 and, in this regard, controller 302 may be activated in response to supplying power to the navigation light 210. In various embodiments, controller 302 may receive a strobe power sense signal 316. The strobe power sense signal 316 may be generated in response to supplying power to the strobe light 214 via strobe light power lines 214. In various embodiments, controller 302 may inhibit the brake light 212 in response to the strobe power sense signal 316. For example, controller 302 may command the power conditioning module 306 to disable the brake lamp power 308. In various embodiments, the controller 302 may alter the intensity of a light emitted by the brake light 212 in response to the deceleration condition or the external signals 310. In various embodiments, the controller 302 may be configured to control the turn indicator lights (218, 220).

Figure 4:
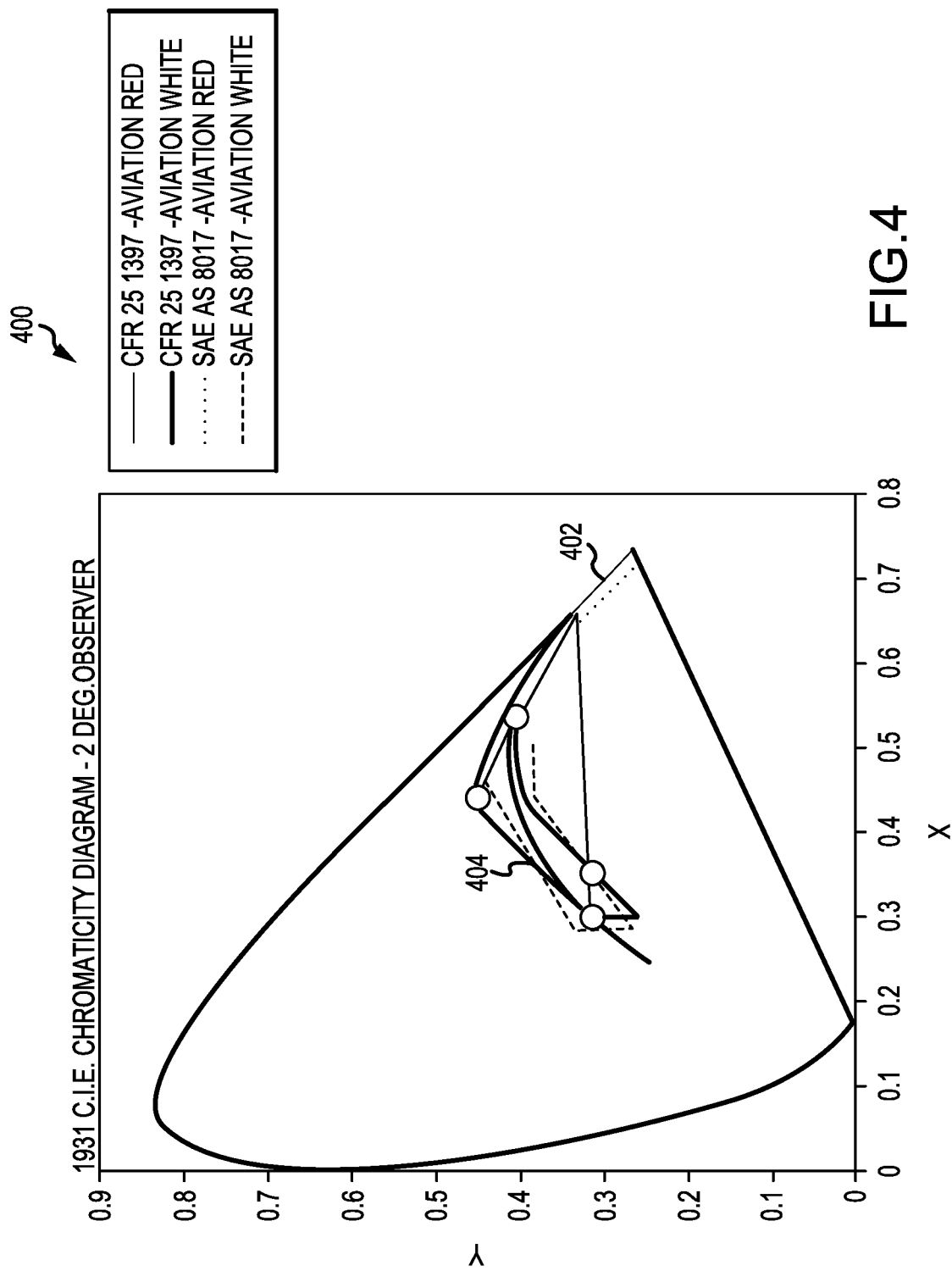
FIG. 4 illustrates a chromaticity diagram of an aircraft brake signal lamp, in accordance with various embodiments.

In various embodiments and with additional reference to FIG. 4, a chromaticity diagram 400 for aircraft brake signal lamp 200 is illustrated. The chromaticity of the brake light 212 is selected from the aviation red region 402. The chromaticity of the navigation light 210 and the turn indicator lights (218, 220) are selected from the aviation white region 404. In various embodiments, an intensity of the brake light 212 may be between 5% and 15%, or may be between 7% and 13%, or may be between 10% and 12%, greater than an intensity of the navigation light 210. In various embodiments, the respective chromaticity and intensity of the brake light 212 and the navigation light 210 may be selected such that a combined far field chromaticity lies within the aviation white region 404.

Figure 5:
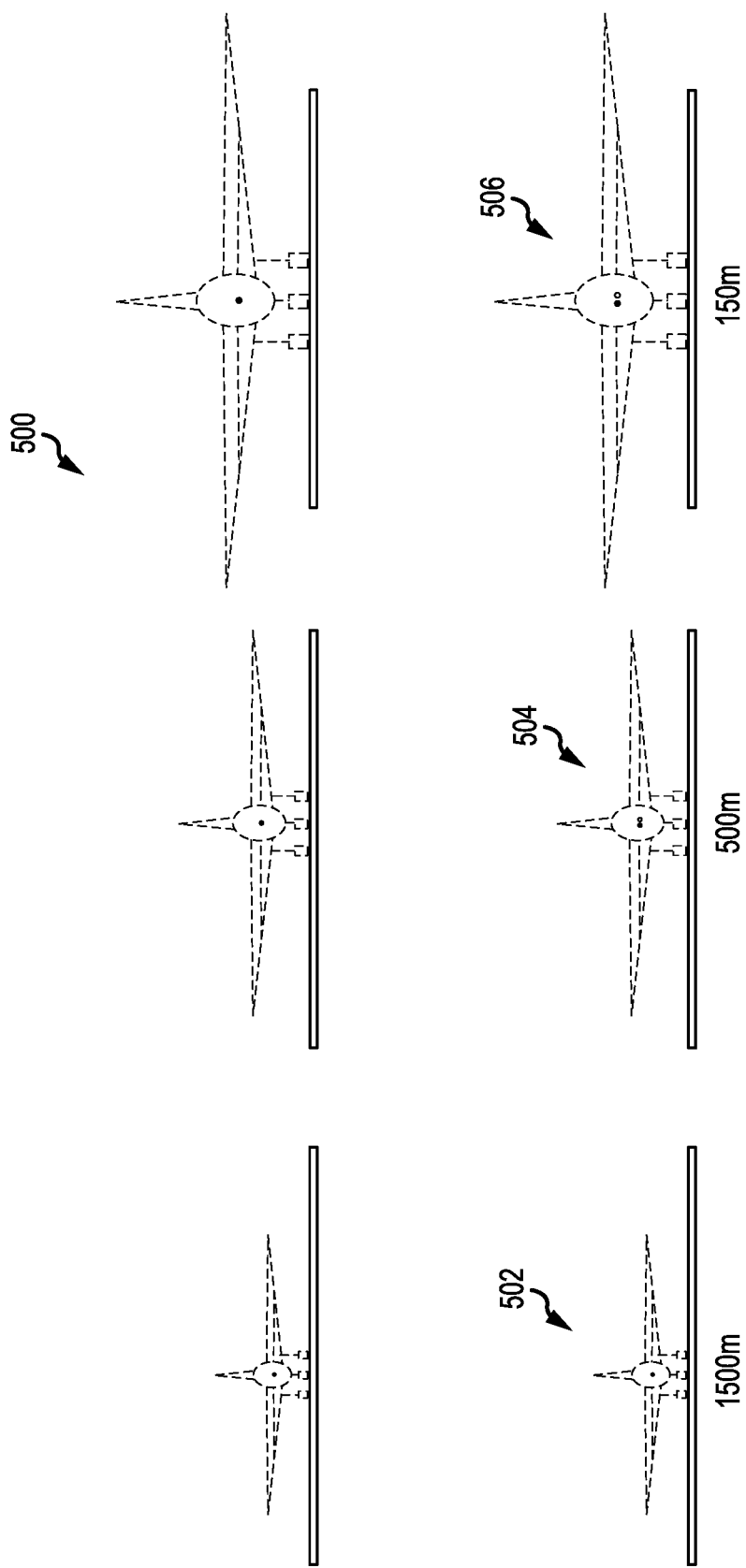
FIG. 5 a visual comparison of an aircraft brake signal lamp, in accordance with various embodiments.

In various embodiments, and with additional reference to FIG. 5, a visual comparison 500 of aircraft brake signal lamp 200 is illustrated for various distances. Aircraft 10 is illustrated in outline as viewed toward empennage 16 such as, for example, from a trailing aircraft at distances of 1500 m, 500 m, and 150 m. In the top row, brake signal lamp 200 is shown having the navigation light 210 illuminated. In the bottom row, brake signal lamp 200 is shown having the navigation light 210 and the brake light 212 illuminated. At 1500 m, both the lights (210 and 212) appear to the viewer as a single light source 502 of the combined far field chromaticity. As the distance decreases toward 500 m, the navigation light 210 and the brake light 212 begin to differentiate into separate light sources 504. At 150 m, the navigation light 210 and the brake light 212 are fully differentiated as individual point light sources 506.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft brake signal lamp, comprising:
a housing;
a navigation light disposed within the housing;
a brake light disposed within the housing, wherein the brake light is configured to illuminate in response to a brake signal;
a controller disposed within the housing; and
a tangible, non-transitory memory configured to communicate with the controller, the tangible, non-transitory memory having instructions stored thereon that, in response to execution by the controller, cause the controller to perform operations comprising:
receiving, by the controller, the brake signal;
illuminating, by the controller, the brake light in response to the brake signal;
receiving, by the controller, a strobe power sense signal; and
inhibiting, by the controller, illumination of the brake light in response to the strobe power sense signal.

2. The aircraft brake signal lamp of claim 1, wherein the housing is defined by a major axis and the navigation light and the brake light are separated from one another along the major axis by a distance D of at least 1 in.

3. The aircraft brake signal lamp of claim 2, wherein the distance D is between 1 in and 10 in.

4. The aircraft brake signal lamp of claim 1, further comprising at least one of a first turn indicator light and a second turn indicator light disposed within the housing, or a strobe light disposed within the housing.

5. The aircraft brake signal lamp of claim 4, wherein the operations further comprise:
controlling, by the controller, the first turn indicator light and the second turn indicator light.

6. The aircraft brake signal lamp of claim 1, wherein the operations further comprise:
receiving, by the controller, an encoded external signal; and
decoding, by the controller, the encoded external signal to generate the brake signal.

7. The aircraft brake signal lamp of claim 1, further comprising a sensor, disposed within the housing, in communication with the controller and configured to provide sensor feedback, wherein the operations further comprise:
receiving, by the controller, a data from the sensor;
determining, by the controller, a deceleration condition; and
illuminating, by the controller, the brake light based on the deceleration condition.

8. The aircraft brake signal lamp of claim 7, wherein the operations further comprise:
altering, by the controller, an intensity of a light emitted by the brake light in response to one of the brake signal or the deceleration condition.

9. The aircraft brake signal lamp of claim 7, wherein the sensor is one of an accelerometer, a global positioning sensor, or an optical flow analysis sensor.

10. The aircraft brake signal lamp of claim 1, wherein the intensity of a light emitted by the brake light is between 5% and 30% of the intensity of a light emitted by the navigation light.

11. An article of manufacture including a tangible, non-transitory computer-readable storage medium having instructions stored thereon that, in response to execution by a processor, cause the processor to perform operations comprising:
receiving, by the processor, an encoded external signal;
decoding, by the processor, the encoded external signal to generate a brake signal;
illuminating, by the processor, a brake light in response to the brake signal;
receiving, by the processor, a strobe power sense signal; and
inhibiting, by the processor, illumination of the brake light in response to the strobe power sense signal.

12. The article of manufacture of claim 11, wherein the operations further comprise:
receiving, by the processor, a data from a sensor;
determining, by the processor, a deceleration condition; and
illuminating, by the processor, the brake light based on the deceleration condition.

13. An aircraft comprising:
a fuselage;
an empennage; and
aircraft brake signal lamp coupled to one of the fuselage or the empennage, comprising:
a housing;
a navigation light disposed within the housing;
a brake light disposed within the housing;
a controller;
a tangible, non-transitory memory configured to communicate with the controller, the tangible, non-transitory memory having instructions stored thereon that, in response to execution by the controller, cause the controller to perform operations comprising:
receiving, by the controller, a brake signal;
illuminating, by the controller, the brake light in response to the brake signal
receiving, by the controller, a strobe power sense signal; and
inhibiting, by the controller, illumination of the brake light in response to the strobe power sense signal.

14. The aircraft of claim 13, wherein the housing is defined by a major axis and the navigation light and the brake light are separated from one another along the major axis by a distance D of between 1 in and 10 in.

15. The aircraft of claim 13, wherein the intensity of a light emitted by the brake light is between 5% and 30% of the intensity of a light emitted by the navigation light.

16. The aircraft of claim 13, further comprising a first turn indicator light and a second turn indicator light disposed within the housing and configured to be controlled by the controller.

17. The aircraft of claim 13, further comprising a strobe light disposed within the housing.

\* \* \* \* \*